(12) United States Patent
Grütter et al.

(10) Patent No.: US 6,676,286 B2
(45) Date of Patent: Jan. 13, 2004

(54) COMPONENT FOR A STATIC MIXER

(75) Inventors: Thomas Grütter, Oberduernten (CH); Rolf Heusser, Winterthur (CH)

(73) Assignee: Sulzer Chemtech AG, Winterthur (CH)

( * ) Notice: Subject to any disclaimer, the term of this patent is extended or adjusted under 35 U.S.C. 154(b) by 52 days.

(21) Appl. No.: 09/999,708

(22) Filed: Oct. 24, 2001

(65) Prior Publication Data

US 2002/0060951 A1 May 23, 2002

(30) Foreign Application Priority Data

Nov. 17, 2000 (EP) .............................. 00811090

(51) Int. Cl.⁷ ................................. B01F 5/06
(52) U.S. Cl. ..................................... 366/337
(58) Field of Search ........................... 366/336, 337, 366/340; 138/37, 38, 42; 165/109.1; 261/94, DIG. 72

(56) References Cited

U.S. PATENT DOCUMENTS

| | | | |
|---|---|---|---|
| 3,311,356 A | * | 3/1967 | Eckert |
| 4,296,779 A | * | 10/1981 | Smick |
| 4,336,838 A | * | 6/1982 | Ely |
| 4,793,713 A | | 12/1988 | King |
| 5,112,536 A | * | 5/1992 | McNulty et al. |
| 5,378,063 A | * | 1/1995 | Tsukada |
| 5,492,408 A | | 2/1996 | Alfaré |
| 5,522,661 A | * | 6/1996 | Tsukada |
| 5,882,772 A | | 3/1999 | Schultes |

FOREIGN PATENT DOCUMENTS

| | | | |
|---|---|---|---|
| CH | 678 284 | * | 8/1991 |
| DE | 1501375 A | | 1/1970 |
| EP | 0697246 A2 | | 2/1996 |
| WO | WO 98/09747 A1 | | 3/1998 |

* cited by examiner

Primary Examiner—Charles E. Cooley
(74) Attorney, Agent, or Firm—Townsend and Townsend and Crew, LLP

(57) ABSTRACT

The component (1) for a static mixer(100) is manufactured by cutting and forming or by stamping out of a planar material strip (10). It extends in a longitudinal direction (11) given by the material strip. The component has transverse segments (2) arranged at intervals transversely to the longitudinal direction (11) that lie in a central plane (12) of the component (1) after forming or stamping. Strip fields (30) are located between the transverse segments (2), correspond to a line pattern made by the cutting or stamping and include longitudinal strips (3), i.e. strips (3) extending in a longitudinal direction. The transverse widths of the strips can be variable. For each strip, half-strips (7, 8'; 8, 7') can be respectively distinguished with respect to the central region (6) of the strip field. The half-strips are bent out of the central plane (12) by the forming or stamping, and each form a bending edge with respect to the transverse segments (2) at the base lines (32).

9 Claims, 3 Drawing Sheets

US 6,676,286 B2

COMPONENT FOR A STATIC MIXER

BACKGROUND OF THE INVENTION

The invention relates to a component for a static mixer, a mixer comprising such a component and a use of the mixer.

A static mixing apparatus for a flowing medium is known from EP-A 0 655 275 whose mixing elements are in each case assembled from two zig-zag or wavy sections. A section comprises longitudinal bars with a respective opening between the bars. The two sections are connected to one another at transverse bars. The longitudinal bars have connecting pieces at the apexes. The sections can be manufactured by stamping them from material strips.

SUMMARY OF THE INVENTION

It is an object of the invention to provide a component for a static mixer which has substantially the same mixing efficiency as the mixing apparatus, whereby the components of this mixer should also be able to be manufactured from a material strip, but in a manner more saving of material.

The component for a static mixer is manufactured by cutting and forming or by stamping from a planar material strip. It extends in a longitudinal direction given by the material strip. The component has the following form:

Transverse segments are arranged at intervals transversely to the longitudinal direction and lie in a central plane of the component after the forming or stamping. Strip fields are located between the transverse segments. The strip fields correspond to the line pattern made by cutting or stamping and consist of longitudinal strips, i.e. strips extending in a longitudinal direction. The transverse widths of the strips can be variable. For each strip, half-strips can be respectively distinguished with respect to the central region of the strip field. The half-strips are bent out of the central plane by the forming or stamping, and each form a bending edge with respect to the transverse segments at baselines bounding the transverse segments.

The invention is described below with reference to the drawings.

DESCRIPTION OF THE PREFERRED EMBODIMENTS

Figure 1:
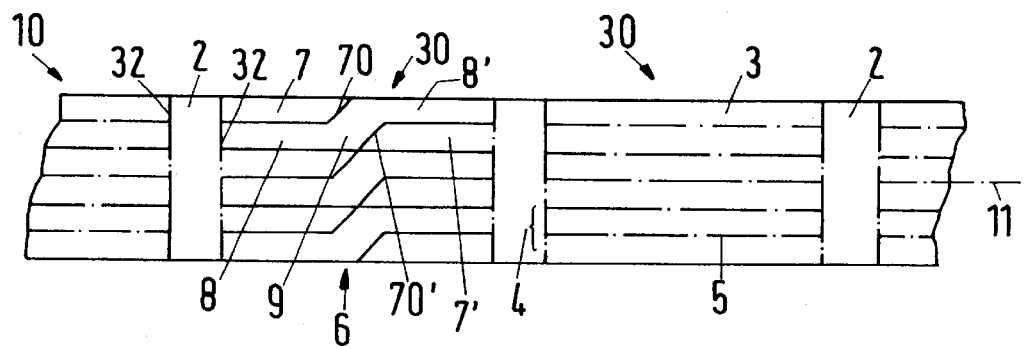
FIG. 1 shows a material strip for a component in accordance with the invention comprising transverse segments and strip fields lying between the segments.

The component 1 (FIG. 2) in accordance with the invention, which is a component for a static mixer 100 (FIG. 4), can be manufactured from a planar material strip 10 (FIG. 1) by cutting and forming or by stamping (i.e. cutting and forming in one working step). Component 1 extends in a longitudinal direction 11 given by the material strip 10. It has the following design in accordance with FIGS. 1 to 5:

Transverse segments 2 are arranged at intervals transversely to the longitudinal direction 11 and lie in a central plane 12 (FIGS. 2, 4) of the component 1 after forming. In the embodiments shown, the intervals are of equal length; however, they can also be irregular. Strip fields 30 are located between the transverse segments 2. The strip fields 30 are made by cutting and comprise longitudinal strips 3, i.e. strips 3 extending in the longitudinal direction 11. The strips 3 start from baselines 32 which bound the transverse segments 2. Each strip 3 is part of a pair of strips 4 which is divided into two strips by a longitudinal, inner boundary line 5. The strips 3 formed from the material are not really continuous in a central region 6 of the strip field 30, but only conceptually continuous. Two half-strips 7, 7' and 8, 8', which are arranged offset to one another in each case, can be differentiated in each strip 3 with respect to the central region 6. The two half-strips 7, 7' of the pair of strips each have a free end 70, 70' in the central region 6, while the two other half-strips 8, 8' are connected by a bridge 9 in the central region 6 which crosses over the inner boundary line 5.

The half-strips 7, 7', 8 and 8' are bent out of the central plane by forming and in each case form a bending edge at the base lines 32 with respect to the transverse segments 2. The bridge 9 of the continuous half-strips 8, 8' forms an apex 9a in each pair of strips 4. The two other half-strips 7, 7' are bent out of the central plane 12 on the other side with respect to the apex 9a.

Figure 3:
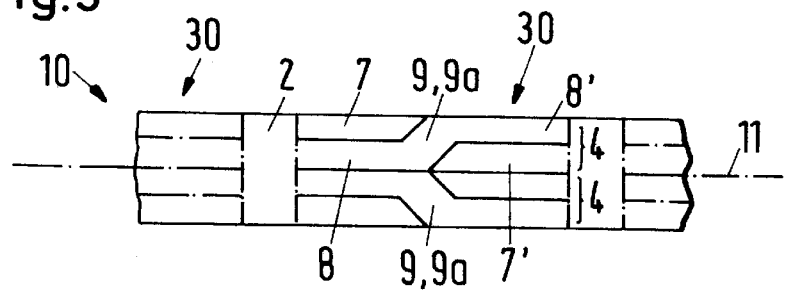
FIG. 3 shows a material strip for a component in accordance with the invention whose strip fields comprise two pairs of strips in each case.

FIG. 3 shows a material strip 10 for a component 1 in accordance with the invention, where the strip fields 30 of the material strip 10 each comprise two pairs of strips 4. A geometrical structure of component 1 can be manufactured which turns in on itself in a 180° turn around the longitudinal central axis 11, with in particular an apex 9a again coming to rest on an apex 9a.

Figure 4:
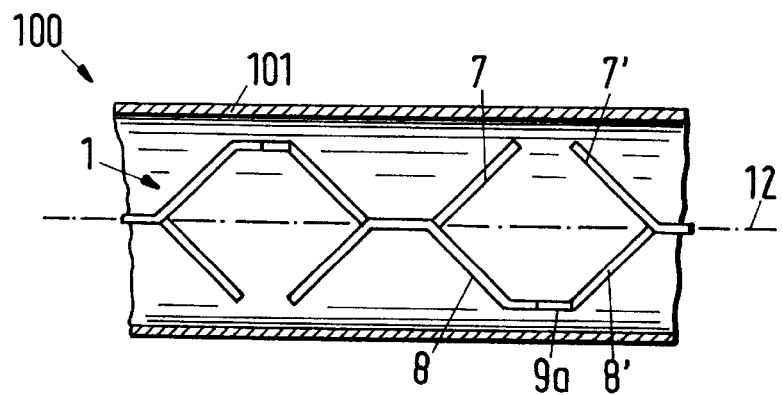
FIG. 4 shows a static mixer in accordance with the invention.

The strip fields 30 of the component 1 can also comprise only one pair of strips 4 in each case. A side view of this embodiment is shown in FIG. 4, with the component 1 being arranged in a tube 101 of the static mixer 100.

Figure 2:
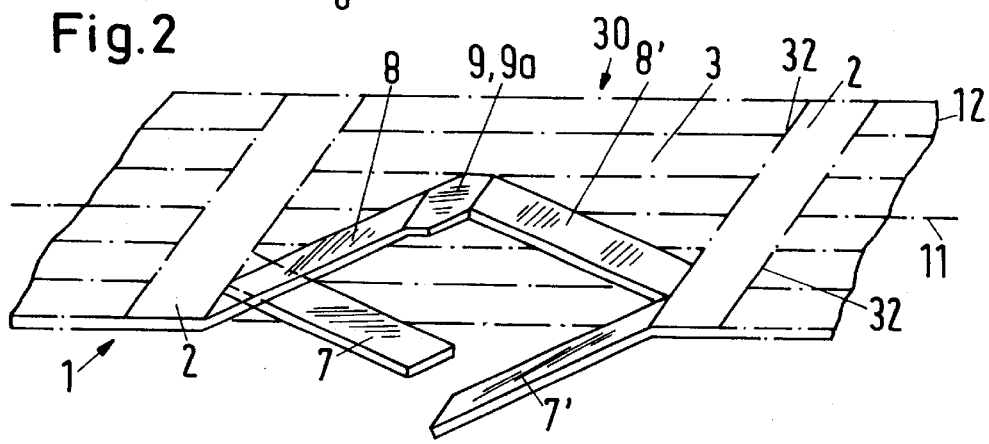
FIG. 2 shows the material of FIG. 1 in an oblique view with a pair of strips whose half-strips are bent out of a central plane.
Figure 5:
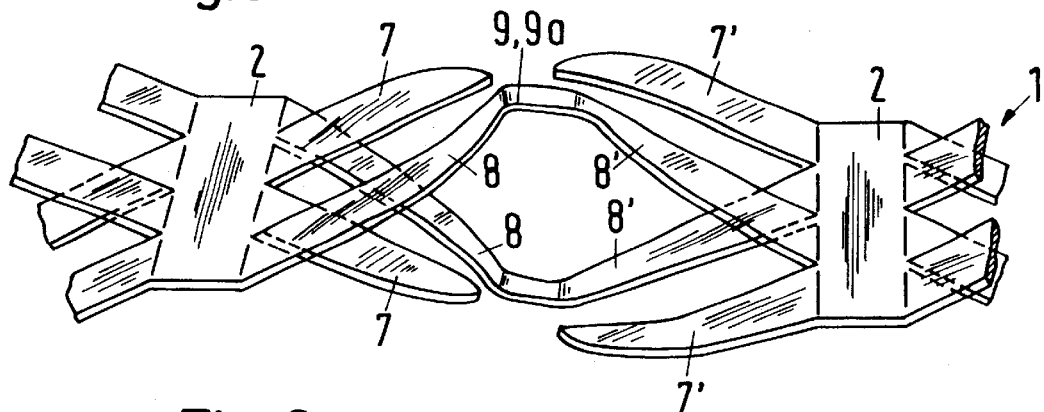
FIG. 5 is a perspective view of a component in accordance with the invention comprising two pairs of strips per strip field.
Figure 6:
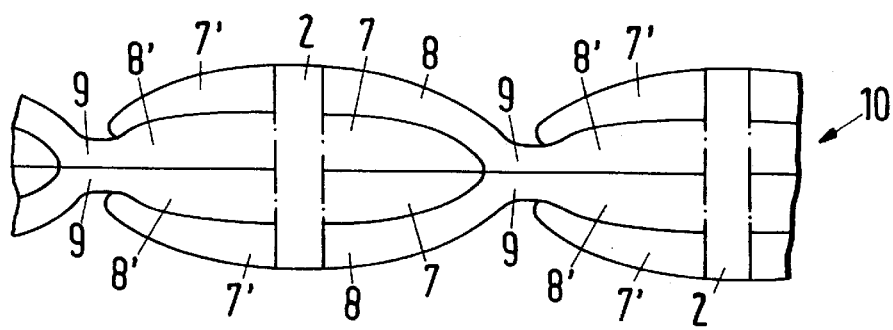
FIG. 6 shows a material strip comprising a line pattern made by cutting, the pattern being able to be made into the shape shown in FIG. 5 by forming.

In the embodiments of FIGS. 1 to 3, the strips 3 have a transverse width which remains constant. This geometry results in a component 1 which is particularly suitable for a rectangular cross-section of the mixer tube 101. For a circular tube cross-section the strip field 30 advantageously has a variable width: strip field 30 tapers symmetrically towards the center; the strips 3 taper correspondingly; and the contour of the strip field 30 at least approaches the shape of two half-ellipses whose apexes touch in the central region 6. A material strip 10 shaped in this way, which results in the component 1 shown in FIG. 5, is shown in FIG. 6. It is the same structural type as already shown in FIG. 3.

Figure 7:
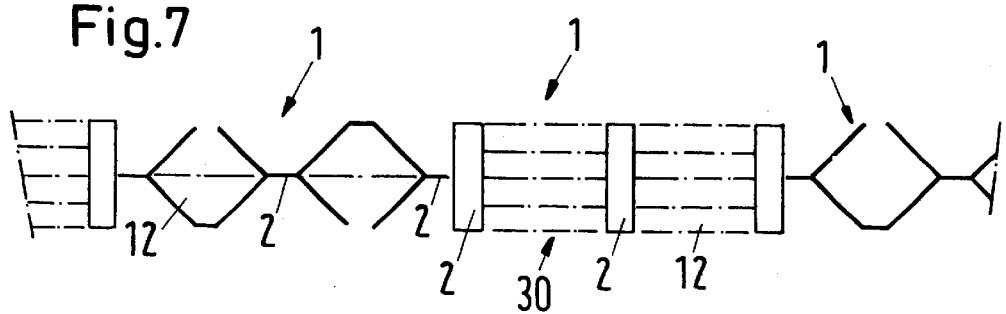
FIG. 7 is a schematic representation of a mixer structure assembled from a sequence of components in accordance with the invention.

A static mixer 100 as a rule and advantageously comprises two or more components 1 which form an alternating sequence, with two components, which are adjacent and arranged one behind the other, having central planes 12 which cross one another. Such an arrangement is shown in schematic form in FIG. 7. The transition from one component 1 to another adjacent one can also have a different design if the one component 1 is modified in the following manner. The segment 2 and the half of the strip field 30 at the one end of the component 1 is removed (or better: not manufactured). Then the other component 1 can be arranged such that its segment 2 comes to rest between the bent-out half-strips of the modified component 1 lying at the end.

Two or more components 1 having cross-sections suitable for a rectangular tube cross-section can be arranged parallel to one another. They can in particular be connected to one another, for example welded, at apexes 9*a*. This is illustrated by FIG. 8.

Figure 9:
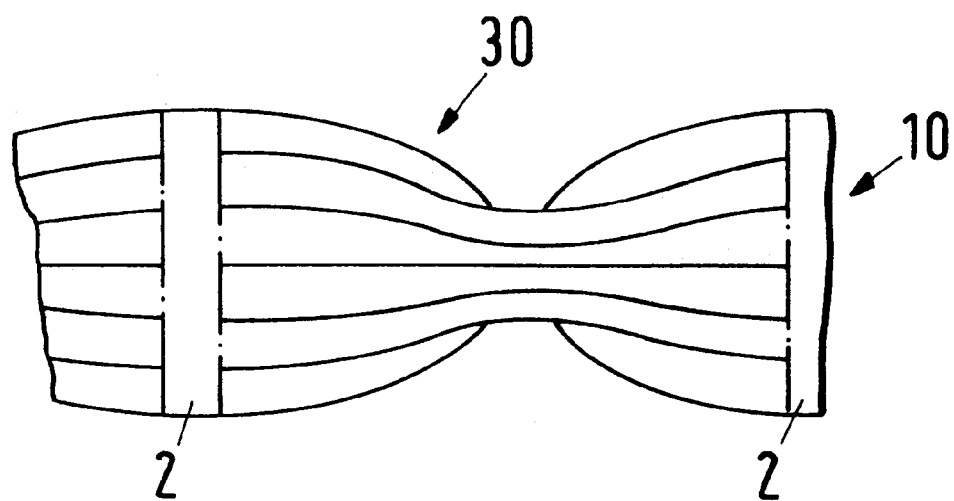
FIGS. 9 and 10 show strip fields of further embodiments of the component in accordance with the invention.
Figure 10:
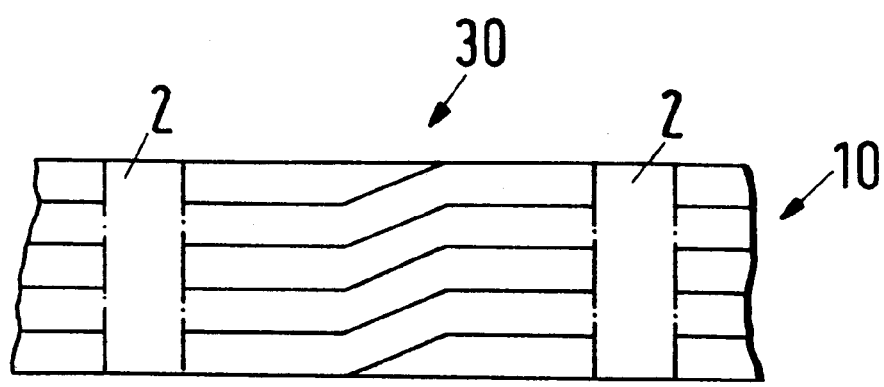

It is not necessary for two half-strips of a pair of strips arranged offset to one another in the component 1 in accordance with the invention to be connected to one another via a bridge. Two half-strips connected to one another can also be associated with the same strip. An example is illustrated by way of a strip field in FIG. 9. A further deviating example where half-strips of the kind having free ends are present only at the edge of the strip field is shown in FIG. 10. Furthermore, the number of strips of the strip field can also be odd: see FIG. 10.

Figure 8:
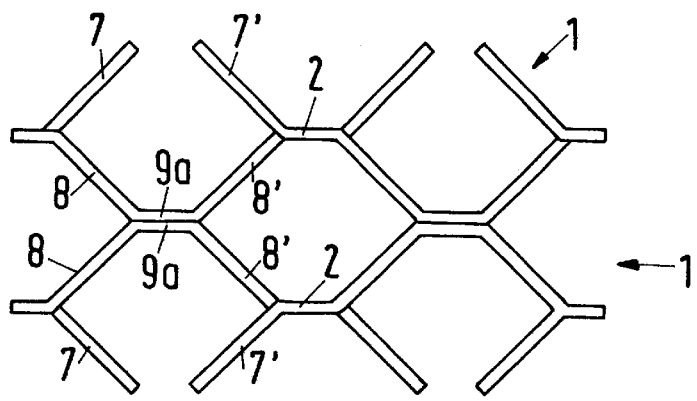
FIG. 8 is a side view of a mixing element assembled from two components in accordance with the invention arranged in parallel.

The components 1 in accordance with the invention which are not connected to adjacent components 1—i.e. with the exception of the embodiment of FIG. 8—are, for example, particularly suitable for the processing of foodstuffs. Connection points between adjacent sections of the mixing elements are also present in EP-A 0 655 275 mentioned above. If there are no connection points between adjacent sections of the mixing elements, a good self-cleaning effect is produced in a continuous mixing process which, for hygienic reasons, is what makes the use of a mixer in accordance with the invention possible at all in diverse uses.

In contrast to the known mixing element of EP-A 0 655 275, no openings have to be made by removing material in the mixing element in accordance with the invention. As a result, material can be saved—as was required.

The material strip 10 can consist of metal or plastic. The cutting of the line pattern can be carried out by stamping or by means of a shear cutting or laser method.

What is claimed is:

1. A component for a static mixer which is manufactured by cutting and forming or by stamping out of planar material strip and which extends in a longitudinal direction given by the material strip, the component comprising transverse segments arranged at intervals transversely to the longitudinal direction, lying in a central plane of the component and being bounded by baselines that are transverse to the longitudinal direction, strip fields located between the transverse segments and corresponding to a line pattern made by the cutting or stamping and comprising longitudinal strips extending in the longitudinal direction, each strip defining half-strips which are distinguishable with respect to a central region of the strip field, the half-strips being bent out of the central plane and each forming a bending edge with respect to the transverse segments at the base lines, the longitudinal strips comprising at least two strips defining part of a pair of strips, wherein in each pair of strips, two first half-strips are offset with respect to another, each having a free end in the central region, two second half-strips being connected to one another by a bridge in the central region which crosses over a longitudinal, inner boundary line, for each pair of strips, the two second half-strips forming an apex on one side of the central plane and the two first half-strips being bent out on another side of the central plane.

2. A component in accordance with claim 1 wherein the strip field is assembled from two pairs of strips, and the component at least approaches a geometrical shape which turns in on itself in a 180° turn about a longitudinally extending central axis.

3. A component in accordance with claim 1 wherein the strip field tapers symmetrically towards the center region, the strips taper correspondingly, and the contour of the strip field at least approaches the shape of two half-ellipses whose apexes touch in the central region.

4. A component in accordance with claim 1 wherein the material strip comprises one of metal and plastic.

5. A static mixer comprising a tube and at least one component arranged in the tube, the component comprising transverse segments arranged at intervals transversely to the longitudinal direction, lying in a central plane of the component and being bounded by baselines that are transverse to the longitudinal direction, strip fields located between the transverse segments and corresponding to a line pattern made by the cutting or stamping and comprising longitudinal strips extending in the longitudinal direction, each strip defining half-strips which are distinguishable with respect to a central region of the strip field, the half-strips being bent out of the central plane and each forming a bending edge with respect to the transverse segments at the base lines, the longitudinal strips comprising at least two strips defining part of a pair of strips, wherein in each pair of strips, two first half-strips are offset with respect to another, each having a free end in the central region, two second half-strips being connected to one another by a bridge in the central region which crosses over a longitudinal, inner boundary line, for each pair of strips, the two second half-strips forming an apex on one side of the central plane and the two first half-strips being bent out on another side of the central plane.

6. A static mixer in accordance with claim 5 wherein two or more components form an alternating sequence, two adjacent components, arranged one behind the other, having central planes crossing one another.

7. A static mixer in accordance with claim 5 wherein two or more components are arranged parallel and adjacent to one another and are connected to one another at apexes.

8. A static mixer in accordance with claim 5 wherein the tube has a circular cross-section, and wherein the strip field of the component tapers symmetrically toward the center region, the strips taper correspondingly, and the contour of the strip field at least approaches the shape of two half-ellipses having apexes that touch in the central region.

9. A method of mixing liquid food products in a mixer comprising providing a static mixer including a tube, placing a mixer component inside the tube, manufacturing the component by cutting and forming, or by stamping out a planar material strip which extends in a longitudinal direction so that the component comprises transverse segments arranged at intervals transversely to the longitudinal direction, lying in a central plane of the component, and being bounded by baselines that are transverse to the longitudinal direction, strip fields located between the transverse segments and corresponding to a line pattern made by the cutting or stamping and including longitudinally extending strips, each strip defining half-strips which are distinguishable with respect to a central region of the strip field, the half-strips being bent out of the central plane and each forming a bending edge with respect to the transverse segments at the baselines, the longitudinal strips comprising at least two strips defining part of a pair of strips, wherein in each pair of strips two first half-springs are offset with respect to one another and each having a free end in the central region while two second half-strips are connected to one another by a bridge in the central region which crosses over a longitudinal, inner boundary line, for each pair of strips, the two second half-strips forming an apex on one side of the central plane and the two first half-strips being bent out on another side of the central plane, and flowing the liquid food product through the mixer, whereby the component in the mixing tube is subjected to self-cleaning during mixing as the liquid food product progresses through the mixer.

\* \* \* \* \*